(12) United States Patent
Lee

(10) Patent No.: US 9,195,089 B2
(45) Date of Patent: Nov. 24, 2015

(54) LIQUID CRYSTAL DISPLAY TOUCH PANEL STRUCTURE

(71) Applicant: SuperC-Touch Corporation, New Taipei (TW)

(72) Inventor: Hsiang-Yu Lee, New Taipei (TW)

(73) Assignee: SUPERC-TOUCH CORPORATION, New Taipei (TW)

(*) Notice: Subject to any disclaimer, the term of this patent is extended or adjusted under 35 U.S.C. 154(b) by 195 days.

(21) Appl. No.: 14/096,555

(22) Filed: Dec. 4, 2013

(65) Prior Publication Data
US 2014/0152918 A1   Jun. 5, 2014

(30) Foreign Application Priority Data
Dec. 5, 2012   (TW) .............................. 101223570 U

(51) Int. Cl.
| | |
|---|---|
| G02F 1/1335 | (2006.01) |
| G02F 1/1333 | (2006.01) |
| G06F 3/033 | (2013.01) |
| G06F 3/0488 | (2013.01) |
| G06F 3/041 | (2006.01) |
| G06F 3/044 | (2006.01) |
| G02F 1/1343 | (2006.01) |

(52) U.S. Cl.
CPC ............ *G02F 1/13338* (2013.01); *G06F 3/033* (2013.01); *G06F 3/044* (2013.01); *G06F 3/0412* (2013.01); *G06F 3/0488* (2013.01); *G02F 2001/134318* (2013.01); *G06F 3/04883* (2013.01)

(58) Field of Classification Search
CPC ... G02F 1/13338; G06F 3/033; G06F 3/0488; G06F 3/04883
See application file for complete search history.

(56) References Cited

U.S. PATENT DOCUMENTS

| | | | |
|---|---|---|---|
| 2009/0096760 A1* | 4/2009 | Ma et al. ........................ | 345/174 |
| 2011/0193820 A1 | 8/2011 | Chen et al. | |
| 2014/0078414 A1* | 3/2014 | Lee ................................. | 349/12 |

* cited by examiner

*Primary Examiner* — Dung Nguyen
(74) *Attorney, Agent, or Firm* — Muncy, Geissler, Olds & Lowe, P.C.

(57) ABSTRACT

A liquid crystal display touch panel structure includes first and second substrates configured therebetween a liquid crystal layer, a TFT layer, and a common electrode layer. The TFT layer is disposed on one surface of the second substrate facing the liquid crystal layer. The TFT layer has plural gate driving lines and plural source driving lines for driving corresponding transistors and capacitors according to a display pixel signal and a display driving signal so as to perform a display operation. The common electrode layer is disposed between the first substrate and the second substrate. The common electrode layer has a plurality of polygon apertures, wherein the plurality of polygon apertures are arranged at positions corresponding to at least part of the gate driving lines and at least part of the source driving lines of the thin film transistor layer.

11 Claims, 5 Drawing Sheets

LIQUID CRYSTAL DISPLAY TOUCH PANEL STRUCTURE

BACKGROUND OF THE INVENTION

1. Field of the Invention

The present invention relates to a structure of touch display panel and, more particularly, to a liquid crystal display touch panel structure.

2. Description of Related Art

In modern society, a liquid crystal display (LCD) device with touch control function has played an important role for the current consumer electronic product, such as the smart phone, digital camera and tablet computer.

In order to provide the LCD device with the touch control function, it is generally to first manufacture a touch panel and an LCD device separately and then combine them together so as to enable the LCD device to have the touch control function. That is, a typical touch display panel is provided with the touch control function by overlapping the LCD device with a touch panel, as the LCD device itself does not have any touch control function.

On-cell and in-cell touch technologies were thus invented to overcome the drawbacks of traditional touch technology described above. The on-cell technology is to dispose sensors on the back side of a color filter substrate to form a completed color filter substrate. One of the on-cell touch technologies is provided to dispose touch sensors on a thin film and then bond the thin film onto the upper one of the two substrates. The in-cell technology is to dispose the sensors within the LCD cell structure. That is, the in-cell touch technology is provided to integrate the touch sensor within the display unit so that the display unit is provided with the ability of the touch panel. Therefore, the touch display panel does not need to be bonded with an additional touch panel so as to simplify the assembly procedure. Such skill is generally developed by TFT LCD manufactures.

In US patent publication 2011/0193820 entitled "touch screen", the horizontal scan row electrodes and the vertical data column electrodes of a thin film transistor (TFT) layer on a TFT LCD panel are used as the driving/sensing conductor lines in a touch control system, so as to eliminate the need of additional driving/sensing conductor layer thereby reducing the cost. However, such a skill may encounter problems when the actual structure of TFT LCD panel is considered. In actual TFT LCD panel, the horizontal scan row electrodes and the vertical data column electrodes are disposed on a TFT layer, while the TFT layer is disposed on a lower glass substrate and a common electrode layer made of transparent metal is formed on the bottom of an upper glass substrate. As a result, when user's finger touches the upper glass substrate, the horizontal scan row electrodes and the vertical data column electrodes are unable to effectively sense the finger's touch because of being shielded by the common electrode layer made of transparent metal, resulting in unsatisfactory touch coordinate calculation. Therefore, it desired for the aforementioned touch display panel system to be improved.

SUMMARY OF THE INVENTION

The object of the present invention is to provide a liquid crystal display touch panel structure, which significantly increases the strength of the sensing signal on a touch panel and greatly saving the material cost and manufacturing cost.

To achieve the object, there is provided a liquid crystal display touch panel structure, which includes: a first substrate; a second substrate parallel to the first substrate; a liquid crystal layer configured between the first substrate and the second substrate; a thin film transistor layer disposed on one surface of the second substrate facing the liquid crystal layer, the thin film transistor layer having K gate driving lines and L source driving lines for driving corresponding transistors and capacitors according to a display pixel signal and a display driving signal so as to perform a display operation, where K and L are each a positive integer; and a common electrode layer disposed between the first substrate and the second substrate, the common electrode layer having a plurality of polygon apertures, wherein the plurality of polygon apertures are arranged at positions corresponding to at least part of the gate driving lines and at least part of the source driving lines of the thin film transistor layer.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
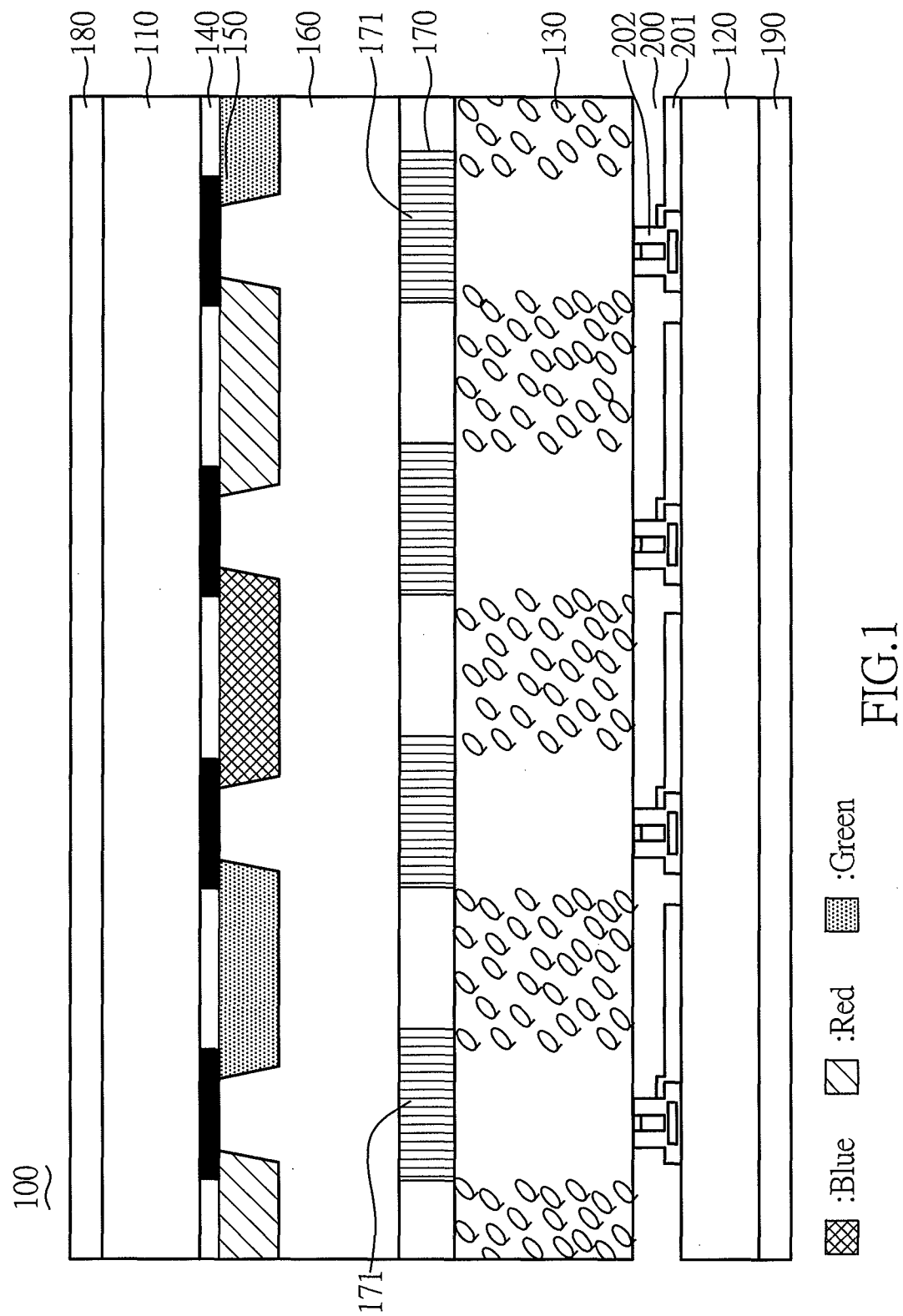
FIG. 1 illustrates a stack-up diagram for an embodiment of a liquid crystal display touch panel structure.

In a stack-up diagram of a preferred embodiment of the present invention, a liquid crystal display touch panel structure 100, as shown in FIG. 1, includes a first substrate 110, a second substrate 120, a liquid crystal layer 130, a black matrix (BM) layer 140, a color filter layer 150, an over coat layer 160, a common electrode (Vcom) layer 170, an upper polarizer layer 180, a lower polarizer layer 190 and a thin film transistor (TFT) layer 200.

The first substrate 110 and the second substrate 120 are preferably glass substrates and are parallel to each other. The liquid crystal layer 130 is disposed between the first and second substrates 110, 120.

The TFT layer 200 is disposed on one surface of the second substrate 120 that faces the liquid crystal layer 130. The TFT layer 200 has K gate driving lines and L source driving lines (not shown) for driving corresponding transistors and capacitors according to a display pixel signal and a display driving signal so as to perform a display operation, where K and L are each a positive integer. In addition to the K gate driving lines and L source driving lines, the TFT layer 200 further includes thin film transistors 202 and transparent electrodes 201.

Figure 2:
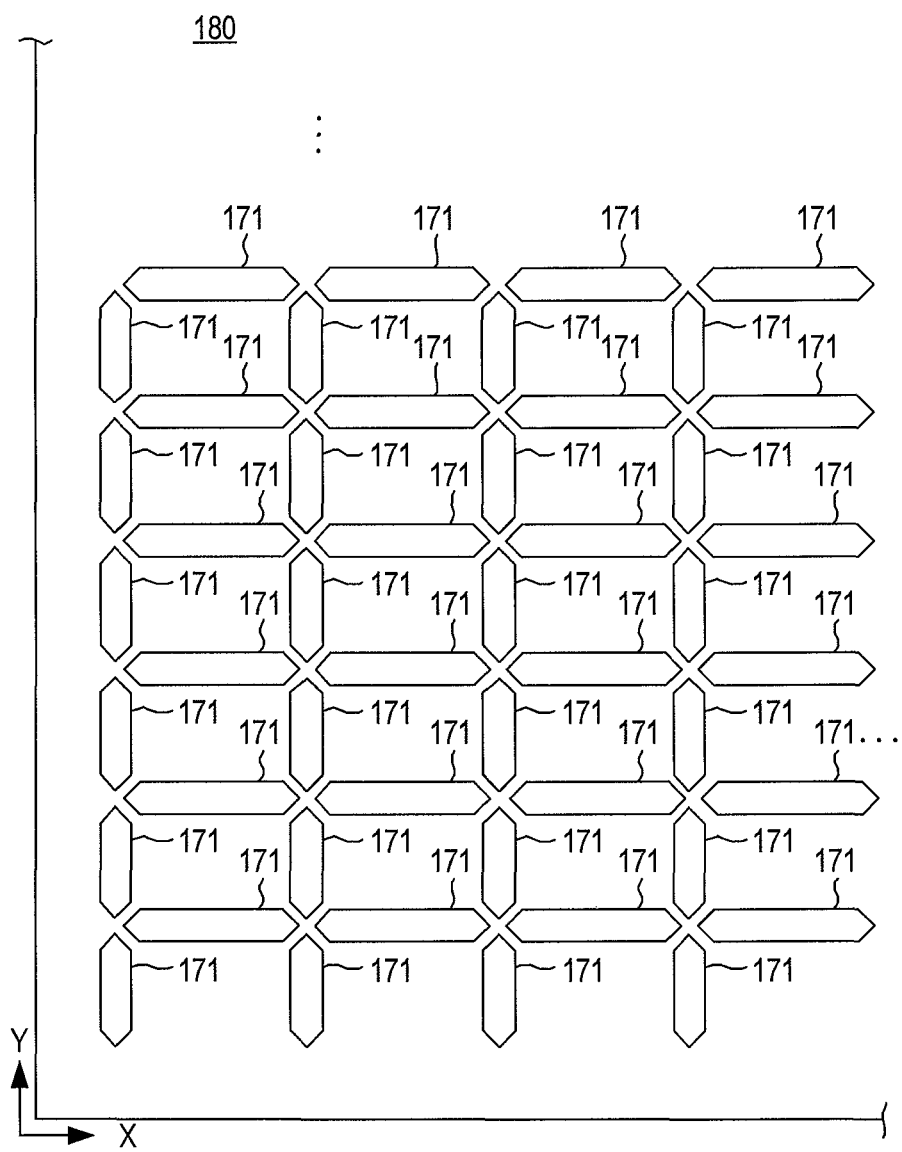
FIG. 2 schematically illustrates the common electrode layer of the present invention.
Figure 3:
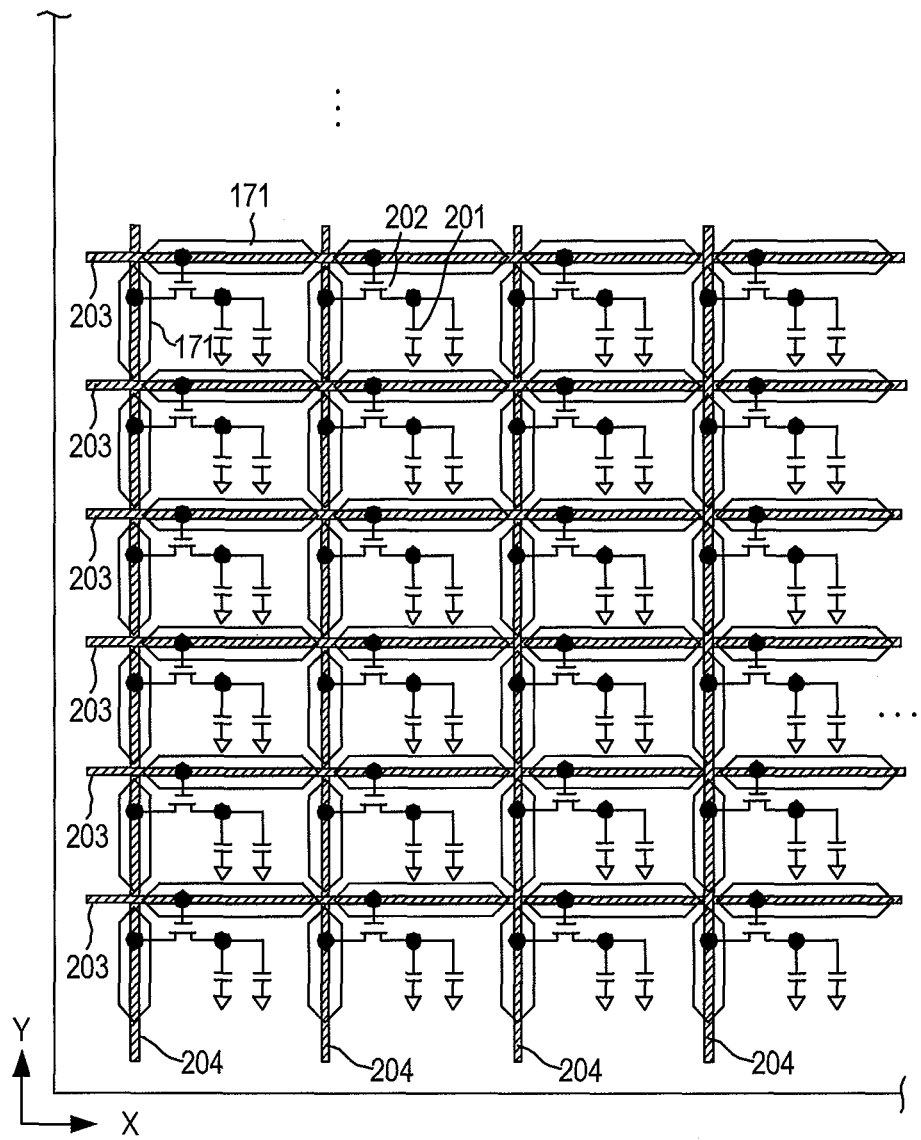
FIG. 3 schematically illustrates both of the common electrode layer and the TFT layer according to a preferred embodiment of the present invention.

FIG. 2 schematically illustrates the common electrode layer 170 of the present invention. FIG. 3 schematically illustrates both of the common electrode layer 170 and the TFT layer 200 according to a preferred embodiment of the present invention. Because the common electrode layer 170 is made of transparent metal, the gate driving lines 203, source driving lines 204, thin film transistors 202 and transparent electrodes 201 of the TFT layer 200 can be seen in FIG. 3.

From FIGS. 1, 2 and 3, it is known that the common electrode layer 170 is disposed between the first substrate 110 and the second substrate 120. The common electrode layer 170 has a plurality of polygon apertures 171. The plurality of polygon apertures 171 are arranged at positions corresponding to the gate driving lines 203 and source driving lines 204 of the TFT layer 200. More specifically, corresponding to each gate driving line 203, there are plural polygon apertures 171 aligned in one row and, corresponding to each source driving line 204, there are plural polygon apertures 171 aligned in one column.

The common electrode layer 170 is made of transparent metal, for example, indium-tin-oxide (ITO). On the common electrode layer, any two of the polygon apertures 171 are not connected with each other. That is, the whole piece of the common electrode layer 170 is in a form of electrical connection. Thus, in display operation, the common electrode layer 170 can still be used as a common ground. The polygon apertures 171 each may have the shape of hexagon, octagon or rectangle.

The gate driving lines 203 and the source driving lines 204 of the TFT layer 200 are arranged in a first direction (X-direction) and a second direction (Y-direction), respectively, wherein the first direction is substantially vertical with the second direction.

Figure 4:
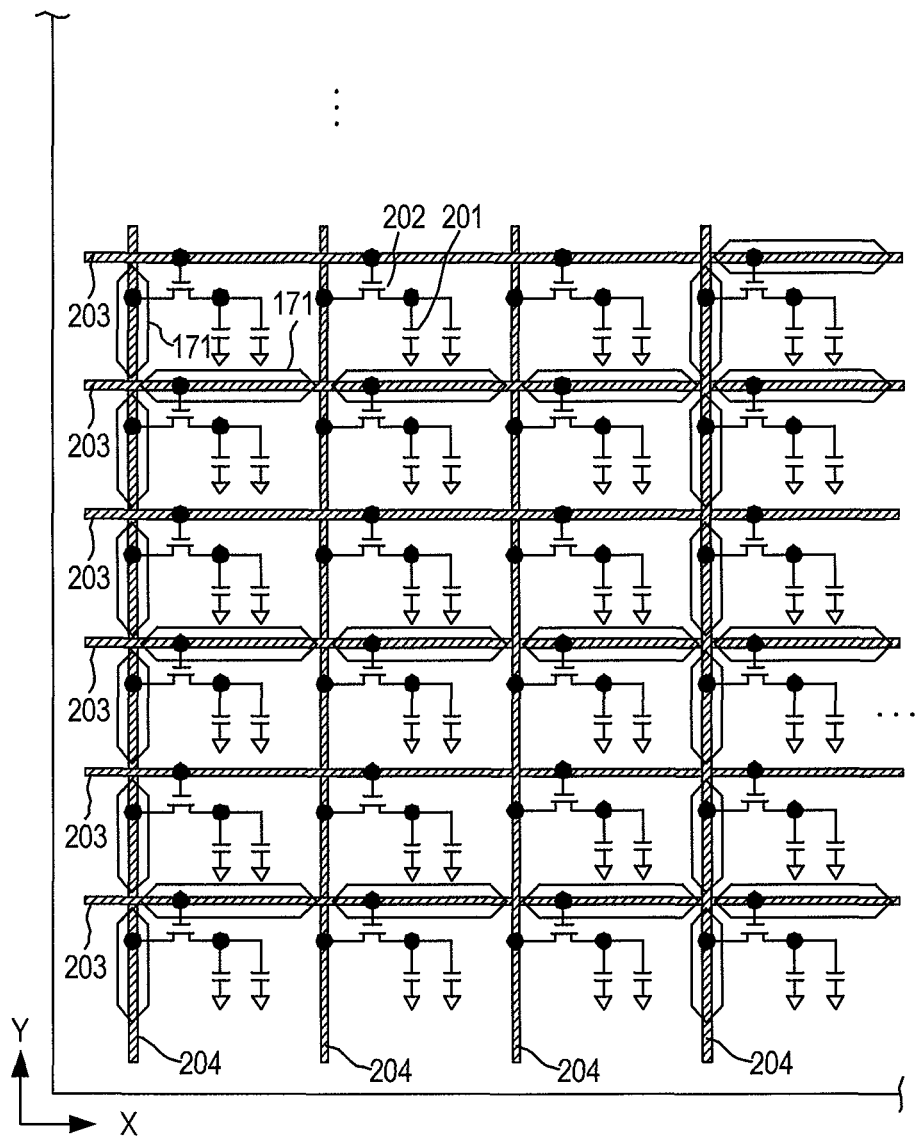
FIG. 4 schematically illustrates both of the common electrode layer and the TFT layer according to another preferred embodiment of the present invention.
Figure 5:
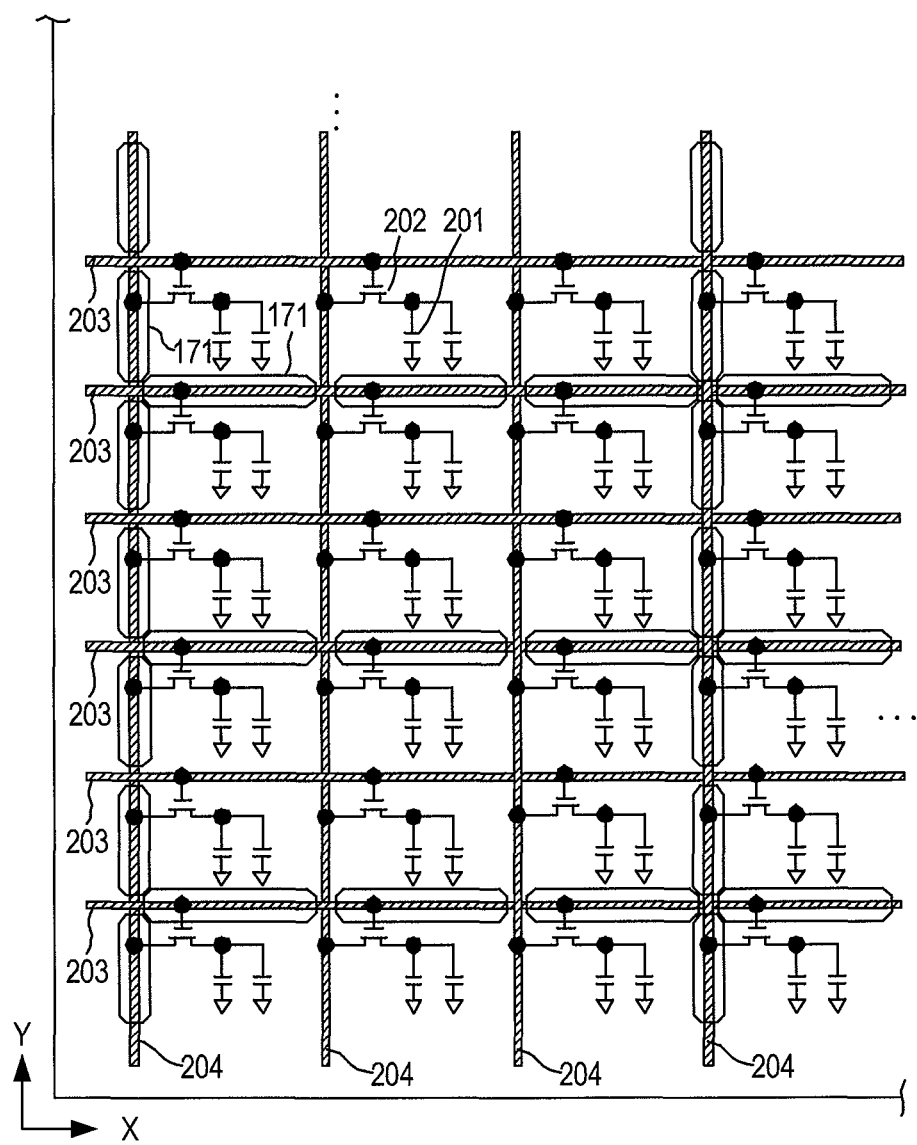
FIG. 5 schematically illustrates both of the common electrode layer and the TFT layer according to a further preferred embodiment of the present invention.

FIG. 4 schematically illustrates both of the common electrode layer 170 and the TFT layer 200 according to another preferred embodiment of the present invention, which is similar to FIG. 3 except that, in X-direction, only one of every three source driving lines 204 corresponds to plural polygon apertures 171 aligned in one column and, in Y-direction, only one of every two gate driving lines 203 corresponds to plural polygon apertures 171 aligned in one row. FIG. 5 schematically illustrates both of the common electrode layer 170 and the TFT layer 200 according to a further preferred embodiment of the present invention, which is similar to FIG. 4 except that each of the polygon apertures 171 is of an octagon shape.

Because the gate driving lines 203 and source driving lines 204 of the TFT layer 200 in the present invention are used as the driving/sensing conductor lines of a typical touch control system, the gate driving lines 203 and source driving lines 204 are required to be operated in a multiplexing manner. That is, in the display period, at least part of the gate driving lines 203 and at least part of the source driving lines 204 are employed to the corresponding transistors (thin film transistors 202) and capacitors (transparent electrodes 201) according to a display pixel signal and a display driving signal, so as to perform a display operation. In the touch control period, the at least part of the gate driving lines 203 and the at least part of the source driving lines 204 are used for touch driving and sensing, and the touch control system can perform self capacitance sensing or mutual capacitance sensing. Alternatively, in the touch control period, the at least part of the gate driving lines 203 and the at least part of the source driving lines 204 can also be used for touch sensing in other embodiments, such as a touch control system that performs electric field sensing.

The black matrix layer 140 is disposed on one surface of the first substrate 110 that faces the liquid crystal layer 130. The black matrix layer 140 is composed of a plurality of opaque lines.

The color filter layer 150 is disposed among the plurality of opaque lines of the black matrix layer 140 and on the surface of the plurality of opaque lines.

The over coat layer 160 is disposed on the surface of the color filter layer 150.

The upper polarizer layer 180 is disposed on one surface of the first substrate 110 opposite to the other surface of the first substrate 110 facing the liquid crystal layer 130.

The lower polarizer layer 190 is disposed on one surface of the second substrate 120 opposite to the other surface of the second substrate 120 facing the liquid crystal layer 130.

In view of the foregoing, it is known that the present invention defines a plurality of polygon apertures 171 in the common electrode layer 170. The advantage is that at least part of the gate driving lines 203 and at least part of the source driving lines 204 of the TFT layer 200 can effectively detect the finger's touch without being shielded by the common electrode layer made of transparent metal as in the prior art, so as to provide more accurate touched positions. Furthermore, the present invention uses at least part of the gate driving lines 203 and at least part of the source driving lines 204 as the sensing conductor lines so that there is no need to manufacture a sensing electrode layer on the upper glass substrate or lower glass substrate of an LCD panel, thereby reducing the cost of production and simplifying the production process.

Although the present invention has been explained in relation to its preferred embodiment, it is to be understood that many other possible modifications and variations can be made without departing from the spirit and scope of the invention as hereinafter claimed.

What is claimed is:

1. A liquid crystal display touch panel structure, comprising:
a first substrate;
a second substrate parallel to the first substrate;
a liquid crystal layer configured between the first substrate and the second substrate;
a thin film transistor layer disposed on one surface of the second substrate facing the liquid crystal layer, the thin film transistor layer having K gate driving lines and L source driving lines for driving corresponding transistors and capacitors according to a display pixel signal and a display driving signal so as to perform a display operation, where K and L are each a positive integer; and
a common electrode layer disposed between the first substrate and the second substrate, the common electrode layer having a plurality of polygon apertures, wherein the plurality of polygon apertures are arranged at positions corresponding to at least part of the gate driving lines and at least part of the source driving lines of the thin film transistor layer.

2. The liquid crystal display touch panel structure as claimed in claim 1, wherein the at least part of the gate driving lines and the at least part of the source driving lines are used for touch driving and sensing during a touch control period.

3. The liquid crystal display touch panel structure as claimed in claim 1, wherein the at least part of the gate driving lines and the at least part of the source driving lines are used for touch sensing during a touch control period.

4. The liquid crystal display touch panel structure as claimed in claim 1, wherein the common electrode layer is made of transparent metal.

5. The liquid crystal display touch panel structure as claimed in claim 4, wherein the transparent metal is indium-tin-oxide (ITO).

6. The liquid crystal display touch panel structure as claimed in claim 5, wherein any two of the polygon apertures are not connected with each other.

7. The liquid crystal display touch panel structure as claimed in claim 6, wherein each of the polygon apertures has a shape of hexagon, octagon or rectangle.

8. The liquid crystal display touch panel structure as claimed in claim 7, wherein the gate driving lines and the source driving lines of the thin film transistor layer are arranged in a first direction and a second direction, respectively.

9. The liquid crystal display touch panel structure as claimed in claim 8, wherein the first direction is substantially vertical with the second direction.

10. The liquid crystal display touch panel structure as claimed in claim 9, further comprising:
- a black matrix layer disposed on one surface of the first substrate facing the liquid crystal layer, the black matrix layer being composed of a plurality, of opaque lines;
- a color filter layer disposed among the plurality of opaque lines of the black matrix layer and on a surface of the plurality of opaque lines; and
- an over coat layer disposed on a surface of the color filter layer.

11. The liquid crystal display touch panel structure as claimed in claim 10, further comprising:
- an upper polarizer layer disposed on one surface of the first substrate opposite to the other surface of the first substrate facing the liquid crystal layer; and
- a lower polarizer layer disposed on one surface of the second substrate opposite to the other surface of the second substrate facing the liquid crystal layer.

\* \* \* \* \*